Jan. 30, 1968    A. M. A. HEUNKS    3,366,682
PROCESS FOR THE PREPARATION OF UREA
Filed May 24, 1965
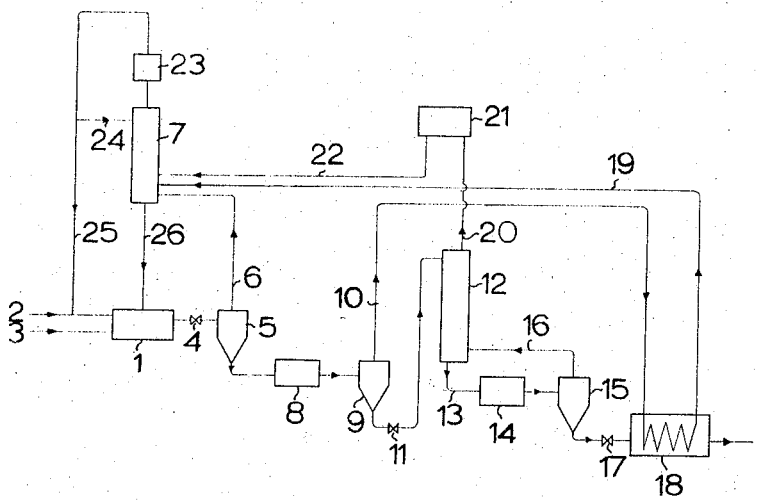
Inventor
Antonius Maria Alphons Heunks
By Cushman, Darby & Cushman
Attorneys

United States Patent Office 3,366,682
Patented Jan. 30, 1968

3,366,682
PROCESS FOR THE PREPARATION OF UREA
Antonius M. A. Heunks, Geleen, Netherlands, assignor to Stamicarbon N.V., Heerlen, Netherlands
Filed May 24, 1965, Ser. No. 458,193
Claims priority, application Netherlands, May 29, 1964, 64—6,024
9 Claims. (Cl. 260—555)

The present invention relates to a process for preparing urea. More particularly, the invention is concerned with certain improvements in preparing urea whereby steam consumption is substantially reduced.

It is well-known that urea may be prepared by reacting ammonia and carbon dioxide with each other at a pressure of at least 160 atmospheres and a temperature above 150° C., after which the resulting reaction mixture is expanded in several stages, gas containing ammonia and carbon dioxide is driven out of the expanded reaction mixture and, completely or partly, reused in the process, while the resulting urea solution is evaporated to the desired concentration.

The process first yields ammonium carbamate, which is thereafter converted into urea and water. However, not all of the ammonium carbamate is converted and, as a result, only part of the resulting reaction mixture consists of urea. Accordingly, a number of procedures have been developed over the years for the purpose of recovering the urea from the reaction mixture and processing the reaction components that have not been converted into urea in order to reduce the operating cost as much as possible.

An important cost factor in the preparation of urea is the steam consumption. According to a well-known process (Belgian Patent No. 620,227) wherein the reaction mixture is expanded in two stages, the steam consumption can be reduced by exchange of heat between the off gases from the ammonium carbamate decomposition in the first stage and the urea solution still containing ammonium carbamate in the second stage. In order to save steam by this prior process while using a heat exchanger with a relatively small heat-exchanging surface area, the pressure in the first stage must be higher than normal. Thus, it is preferred to use pressures between 25 and 50 atmospheres in the first stage and between 1 and 3 atmospheres in the second stage.

A disadvantage in the prior process referred to above is that the decomposition of the ammonium carbamate cannot take place under optimum conditions. This is due to the fact that as the pressure in the first stage is increased, the amount of water to be added to the ammonium carbamate solution to be recirculated in the second stage must be increased to prevent crystallization of ammonium carbamate.

The principal object of the present invention is to provide a novel process for preparing urea which is free from the prior art problems referred to above and makes it possible to substantially reduce the steam consumption. Other objects will also be apparent.

Broadly stated, the present invention provides a process in which a considerable saving in steam is effected in a simple way in that at least part of the gas containing ammonia and carbon dioxide obtained at a pressure above 10 atmospheres, is condensed by exchange of heat with the urea solution to be evaporated. Partly owing to the formation of ammonium carbamate, a large amount of heat becomes available in this condensation for the evaporation of the urea solution. The mixture of condensate and non-condensed gas can be further treated in the process by methods known in the art.

The heat exchange according to the invention can be applied both in processes with complete recirculation, and in processes with partial recirculation of the ammonia and carbon dioxide that have not been converted into urea. In the case of complete recirculation, optimum results are usually obtained if the reaction mixture is expanded in two stages at a pressure between 15 and 25 atmospheres in the first stage and at a pressure of, for instance, 2–5 atmospheres in the second stage. The gases driven off in the first expansion stage are eminently suited for exchanging heat with the urea solution to be evaporated. In this case, the difference in pressure between the heat-exchanging media is of the order of 15 to 25 atmospheres, as the urea solution is mostly evaporated at a pressure of 0.03–0.05 atmosphere. This difference in pressure is considerably lower than that employed in the prior process. Consequently, the heat exchanger used in practicing the invention need not be as heavy as in the prior process.

An additional advantage of the present process is that if the usual pressure of 15 to 25 atmospheres is used in the first expansion stage, the amount of heat that can be recovered by cooling and condensation of hot gas mixture from the first expansion stage, is always smaller than the amount of heat required for evaporating the urea solution. As a result, the evaporation can be conveniently controlled, without affecting the condensation of the gas mixture, by controlling the additional heat input which is supplied for instance, in the form of steam.

A further advantage of the present process is that the evaporation temperature of the urea solution is lower than the decomposition temperature of the carbamate in the second expansion stage if, to achieve optimum results, the pressure in this stage is kept at 2–5 atmospheres. This means that heat-exchange between the off-gases from the first expansion stage and the urea solution to be evaporated releases more heat from said off-gases than can be set free by heat-exchange in the second stage between said off-gases and the carbamate solution to be decomposed. For example, a gas mixture containing 41.5% by weight of $CO_2$, 43% by weight of $NH_3$ and 15.5% by weight of $H_2O$ and having a pressure of 18 atm. and a temperature of 160° C., will yield 2.4 times as many calories upon cooling to 120° C. than upon cooling to 130° C.

By preference, only the carbon dioxide and ammonia-containing gas driven off from the expanded reaction mixture by heating is used for exchanging heat with the urea solution to be evaporated, as the temperature of said gas is higher than that of the gas released at the same pressure as a result of the expansion. It is true that a slightly smaller amount of heat will then become available for evaporation of the urea solution, but the heat-exchanging surface area can be made considerably smaller.

One way of practicing the invention is described in detail below in conjunction with the attached drawing, it being understood that this is given only for purposes of illustration and is not intended to be limiting.

At a pressure of 200 atmospheres, a temperature of 190° C., and an ammonia/carbon dioxide ratio of 4 to 1, the urea synthesis is effected in an autoclave 1, to which ammonia and carbon dioxide are supplied via conduits 2 and 3, respectively. Through valve 4, the reaction mixture discharged from the autoclave 1 is expanded to a pressure of 18 atmospheres, as a result of which the temperature decreases to about 125° C. In a separator 5, the expanded reaction mixture is then separated into gas containing carbon dioxide and ammonia, and liquid containing urea. The gas from separator 5 is fed to a washing column 7 via a conduit 6. The liquid from separator 5 is fed to a heater 8, in which the liquid is heated up to about 160° C. The resulting gas containing ammonia and carbon dioxide is separated from the liquid in a separator 9 from which it is discharged through a conduit 10. The urea-containing liquid from separator 9 is expanded to a pressure of 4 atmospheres via a valve 11, as a result of which a gas-liquid mixture forms, which is fed to a rectifying column 12. The liquid issuing from the column 12 goes via conduit 13 to heater 14, in which gas containing ammonia and carbon dioxide is released from the liquid. The gas-liquid mixture from heater 14 is separated in separator 15, after which the gas is fed back to column 12 via conduit 16 and the liquid is expanded through valve 17 and fed to evaporator 18. The liquid from separator 15 is a virtually pure urea solution of about 72% by weight concentration.

In the evaporator, the urea solution is evaporated at a pressure of about 0.4 atmosphere and a temperature of 105° C., the required heat being delivered by the off-gases from separator 9 which, at a temperature of about 160° C., are fed to evaporator 18 via conduit 10. A portion of these exhaust gases is condensed in evaporator 18, after which the gas-liquid mixture is fed to wash column 7 via conduit 19 at a temperature of about 125° C. A urea solution of about 86% by weight concentration is obtained from evaporator 18 and can be further concentrated in known fashion. This further concentration can be effected in an evaporation zone which is integral with the evaporator 18, but has a separate heating unit.

The gas containing ammonia and carbon dioxide from rectifying column 12 goes via conduit 20 to condenser 21, where it is virtually completely condensed to an ammoniacal ammonium carbamate solution by addition of water. This solution is then pumped into washing column 7 via conduit 22. The gases ascending in washing column 7 are washed clear of carbon dioxide, so that pure, gaseous ammonia can be discharged from said colunm. This gaseous ammonia is liquefied in a cooler 23, and partly fed back to washing column 7 via a conduit 24. The portion of the liquid ammonia not fed back to the said column is pumped to the autoclave 1 via a conduit 25. The ammoniacal ammonium carbamate solution issuing from column 7 is pumped to the autoclave 1 via conduit 26.

Various modifications may be made in the invention described herein. Hence, the scope of the invention is defined in the following claims wherein:

What is claimed is:

1. In a process for the preparation of urea wherein ammonia and carbon dioxide are reacted with each other at a pressure of at least 160 atmospheres and a temperature above 150° C., the resulting reaction mixture is expanded in several stages, gas containing ammonia and carbon dioxide is driven out of the expanded reaction mixture and at least partially used in the process, and the resulting urea solution which is essentially free of ammoniumcarbamate is evaporated, the improvement which comprises heating said expanded reaction mixture previously separated from a gas containing ammonia and carbon dioxide, said expanded reaction mixture being at a pressure above 10 atmospheres, thereby driving off gas containing ammonia and carbon dioxide, condensing at least partially said gas containing ammonia and carbon dioxide, which is driven off from said expanded reaction mixture at a pressure above 10 atmospheres by heating, said condensation being carried out by exchange of heat between said gas and the urea solution to be evaporated.

2. The process of claim 1 wherein the reaction mixture is expanded in two stages to a pressure between 15 and 25 atmospheres in the first stage, and to a pressure between 2 and 5 atmospheres in the second stage.

3. In a process for producing urea by the reaction of ammonia with carbon dioxide at a pressure of at least 160 atmospheres and a temperature above 150° C., and wherein the pressure on the resulting reaction mixture is subsequently reduced in more than one stage to release a gaseous mixture containing ammonia and carbon dioxide and separating the same from the remaining liquid product solution essentially comprised of urea, and wherein thereafter said product solution is evaporated under reduced pressure to the desired concentration, the improvement consisting essentially in heating the reaction mixture previously separated from a gas containing ammonia and carbon dioxide at said reduced pressure to drive off gas containing ammonia and carbon dioxide, bringing said gases driven off by heating said reaction mixture at said reduced pressure into indirect heat exchange contact with the said urea product solution whereby the temperature of said gases is lowered to a level at which there is formed ammoniumcarbamate from the ammonia and carbon dioxide, and thereby heating said liquid product solution by heat exchange with said gases including transfer of, at least in part, the heat released from the exothermic ammoniumcarbamate reaction in said thus-cooled gases and utilizing the thereby transferred heat to evaporate said urea solution to the desired concentration.

4. The process of claim 3 wherein the pressure on said reaction mixture is reduced in two stages.

5. The process of claim 4 wherein the pressure on said reaction mixture is reduced in the first stage to between about 15 and about 25 atmospheres, and reduced in the second stage to between about 2 and 5 atmospheres.

6. The process of claim 5 wherein the evaporation of said urea solution takes place at a pressure between about 0.03 and 0.05 atmosphere.

7. In a process for producing urea by the reaction of ammonia with carbon dioxide at a pressure of at least 160 atmospheres and a temperature of above 150° C. and wherein the pressure on the resulting reaction mixture is subsequently reduced in a first and second stage to release a gaseous mixture containing ammonia and carbon dioxide and separating the same from the remaining liquid product solution essentially composed of urea, and wherein thereafter said product solution is evaporated under reduced pressure to the desired concentration, the improvement consisting essentially in heating the reaction mixture previously separated from a gas containing ammonia and carbon dioxide at said reduced pressure in said first stage to drive off gas containing ammonia and carbon dioxide, bringing said gases released by said heating in said first stage into indirect heat exchange contact with the said urea product solution whereby the temperature of said gases is lowered to a level at which there is formed ammoniumcarbamate from the ammonia and carbon dioxide contained in said gases, and thereby heating said liquid product urea solution by heat exchange with said gases including transfer of, at least in part, the heat released from the exothermic ammonium-carbamate-forming reaction in said thus-cooled gases and utilizing the thereby transferred heat to evaporate said urea product solution to the desired concentration.

8. The process of claim 7 wherein the evaporation of said urea product solution takes place at a pressure of about 0.03 to about 0.05 atmosphere.

9. The process of claim 8 wherein the pressure on the said resulting reaction mixture is reduced in said first stage to between about 15 and about 25 atmospheres, and reduced in said second stage to between about 2 and about 5 atmospheres.

References Cited

UNITED STATES PATENTS

| 3,090,811 | 5/1963 | Otsuka et al. | 260—555 |
| 3,137,725 | 6/1964 | Cook et al. | 260—555 |

FOREIGN PATENTS 224,126   4/1958   Australia.

HENRY R. JILES, Primary Examiner.

ALEX MAZEL, Examiner.